(12) United States Patent
Bernal et al.

(10) Patent No.: US 10,018,703 B2
(45) Date of Patent: Jul. 10, 2018

(54) METHOD FOR STOP SIGN LAW ENFORCEMENT USING MOTION VECTORS IN VIDEO STREAMS

(75) Inventors: Edgar A. Bernal, Webster, NY (US); Orhan Bulan, Greece, NY (US); Robert P. Loce, Webster, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 990 days.

(21) Appl. No.: 13/613,174

(22) Filed: Sep. 13, 2012

(65) Prior Publication Data

US 2014/0071286 A1 Mar. 13, 2014

(51) Int. Cl.
| | | |
|---|---|---|
| *G01S 3/786* | (2006.01) | |
| *G06K 9/00* | (2006.01) | |
| *G06K 9/62* | (2006.01) | |
| *G08G 1/04* | (2006.01) | |
| *G08G 1/017* | (2006.01) | |
| *G08G 1/0967* | (2006.01) | |
| *G06T 7/215* | (2017.01) | |
| *G06T 7/20* | (2017.01) | |

(Continued)

(52) U.S. Cl.
CPC ............ *G01S 3/7864* (2013.01); *G06T 7/20* (2013.01); *G06T 7/223* (2017.01); *G06T 7/246* (2017.01); *G06T 7/269* (2017.01); *G08G 1/0175* (2013.01); *G08G 1/096716* (2013.01); *G08G 1/096741* (2013.01); *G08G 1/096783* (2013.01); *G06K 9/00771* (2013.01); *G06K 9/00785* (2013.01); *G06K 9/6218* (2013.01); *G06T 7/215* (2017.01); *G06T 2207/30236* (2013.01);

(Continued)

(58) Field of Classification Search
None
See application file for complete search history.

(56) References Cited

U.S. PATENT DOCUMENTS

| | | |
|---|---|---|
| 6,011,870 A | 1/2000 | Jeng et al. |
| 6,442,474 B1 | 8/2002 | Trajkovic et al. |

(Continued)

FOREIGN PATENT DOCUMENTS

| | | |
|---|---|---|
| GB | 2503323 A | 12/2013 |
| JP | 2010198634 | 9/2010 |
| WO | 0005410 | 2/2000 |

OTHER PUBLICATIONS

Karaduman et al.—Approaching Car Detection via Clustering of Vertical Horizontal Line Scanning Optical Edge Flow, 2012 15th International IEEE Conference on Intelligent Transportation Systems, Anchorage, Alaska, USA, Sep. 16-19, 2012, All pages.*

(Continued)

*Primary Examiner* — Joseph Ustaris
*Assistant Examiner* — William Adrovel
(74) *Attorney, Agent, or Firm* — Fay Sharpe LLP (57) ABSTRACT

A method for enforcing traffic signal compliance includes acquiring a series of temporal related image frames including a target area. Each image frame includes pixel data representative of the target area. The method includes generating one or more motion vectors between two or more of the image frames. The motion vectors are the type produced by compressing the pixel data associated with the two or more image frames. The method includes associating a cluster of motion vectors with a vehicle. The method further includes tracking a position of the vehicle across the two or more image frames. Using the tracking results, the method includes determining whether the vehicle stops in the target area. For the vehicle being determined as not stopping, the method includes signaling an occurrence of noncompliance.

20 Claims, 10 Drawing Sheets

(51) Int. Cl.
G06T 7/223 (2017.01)
G06T 7/246 (2017.01)
G06T 7/269 (2017.01)
H04N 19/139 (2014.01)
H04N 19/513 (2014.01)

(52) U.S. Cl.
CPC ............. G08G 1/04 (2013.01); H04N 19/139 (2014.11); H04N 19/513 (2014.11)

(56) References Cited

U.S. PATENT DOCUMENTS

| | | | |
|---|---|---|---|
| 6,757,328 B1* | 6/2004 | Huang et al. | 375/240.1 |
| 2002/0196341 A1* | 12/2002 | Kamijo et al. | 348/149 |
| 2006/0092280 A1* | 5/2006 | Kamijo et al. | 348/169 |
| 2006/0140447 A1* | 6/2006 | Park | G06K 9/00805 382/104 |
| 2007/0290886 A1* | 12/2007 | Stam et al. | 340/907 |
| 2008/0205710 A1* | 8/2008 | Benten | 382/107 |
| 2009/0074310 A1 | 3/2009 | Miaou et al. | |
| 2009/0207046 A1* | 8/2009 | Arrighetti | G06K 9/3258 340/937 |
| 2011/0169957 A1 | 7/2011 | Bartz | |
| 2011/0255740 A1* | 10/2011 | Wu et al. | 382/103 |
| 2012/0262579 A1* | 10/2012 | Chen et al. | 348/148 |
| 2013/0151135 A1* | 6/2013 | Aubrey et al. | 701/118 |
| 2013/0170557 A1* | 7/2013 | Wang et al. | 375/240.24 |
| 2014/0003724 A1* | 1/2014 | Feris et al. | 382/197 |
| 2014/0195138 A1* | 7/2014 | Stelzig et al. | 701/119 |

OTHER PUBLICATIONS

Shuigen et al.—Motion Detection Based on Temporal Difference Method and Optical Flow field, 2009 Second International Symposium on Electronic Commerce and Security, All pages.*

"War on Driving", Copyright 2011, retrieved from the Internet Sep. 11, 2012, http://warondriving.com/post/9215745267/los-angeles-stop-sign-cameras.

"Stop Sign Ticket Cameras Developed", May 9, 2007, retrieved from the Internet Sep. 12, 2012, http://www.thenewspaper.com/news/17/1742.asp.

Horn et al., "Determining Optical Flow", Artificial Intelligence, 17 (1981) 185-203, North-Holland.

Lowe, "Distinctive Image Features from Scale-Invariant Keypoints", International Journal of Computer Vision, 2004.

Lucas et al., "An Iterative Image Registration Technique with an Application to Stereo Vision", research sponsored by the Defense Advanced Research Projects Agency, ARPA Order No. 3597, monitored by the Air Force Avionics Laboratory Under Contract F33615 78-C-1551, pp. 674-679.

Matas et al., "Robust Wide Baseline Stereo From Maximally Stable Extremal Regions", BMVC, 2002, pp. 384-386.

Black et al., "A Model for the Detection of Motion over Time", Proceedings of the International Conference on Computer Vision, Osaka, JP, Dec. 1990, 5 pgs.

Harris et al., "A Combined Corner and Edge Detector", Plessey Research Roke Manor, UK, The Plessey Company plc., 1988, pp. 147-152.

Bay et al., "SURF: Speeded Up Robust Features", pp. 1-14.

Huang, "Survey on Block Matching Motion Estimation Algorithms and Architectures with New Results", Journal of VLSI Signal Processing 42, 297-320, 2006.

Wiegand et al., "Overview of the H.264 / AVC Video Coding Standard", IEEE Transactions on Circuits and Systems for Video Technology, Jul. 2003, pp. 1-19.

Lima et al., "High Definition Video Broadcast Over Core IP Networks", J.J. Optical Fiber communication Conference, 2006 and the 2006 National Fiber Optic Engineers Conference—1005-10, Mar. 2006.

UKIPO Search Report, Application No. GB1316117.9, Dated of Search Mar. 12, 2014, dated Mar. 13, 2014.

* cited by examiner

METHOD FOR STOP SIGN LAW ENFORCEMENT USING MOTION VECTORS IN VIDEO STREAMS

BACKGROUND

The present disclosure relates to a system and method for automated video-based traffic enforcement. The system operates on motion vector data describing the apparent motion in the captured scene. The present disclosure finds application in stop signal enforcement. However, it is appreciated that the present exemplary embodiments are also amendable to other like applications.

Stop signals are generally introduced in regions where conflicting traffic movements can cause a risk of accident. Stop signals often include stop signs, stoplights, and other universal indicators. However, compliance becomes voluntary without use of a physical enforcer, such as an officer or gate. Therefore, multiple methods are introduced to ensure compliance with a signal.

Figure 1:
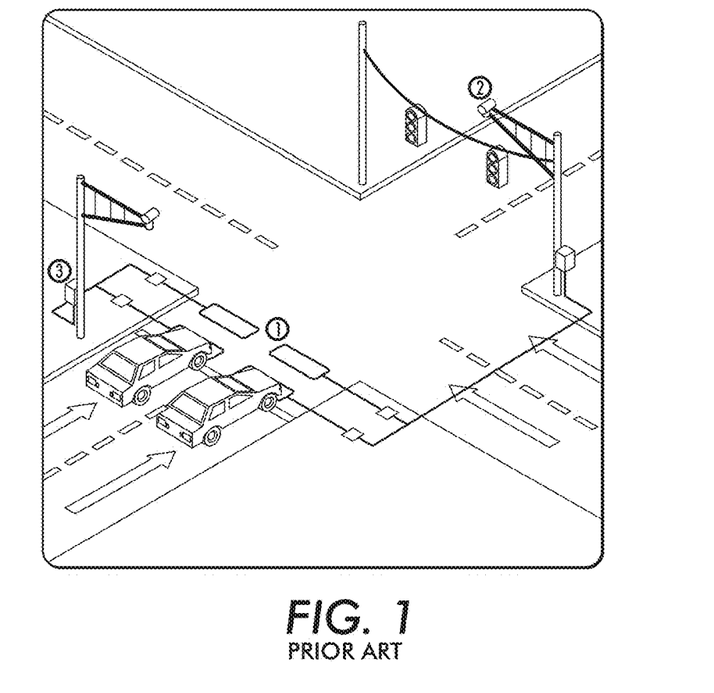
FIG. 1 illustrates a conventional multi-modular enforcement system according to the PRIOR ART.

In one conventional method, stoplights are equipped with cameras that capture vehicles entering an intersection. One technology uses an induction loop in communication with the camera, as shown in FIG. 1. The induction loop relies on a vehicle detector module embedded under a road surface near or around a stop ("limit") line. FIG. 1 shows a first loop that triggers vehicle presence and a second loop that detects a violation. Both loops are activated in quick succession when the stoplight turns red, at which time the controller in communication with the detector automatically sends a signal to the camera, which captures an image of the scene. The vehicle, crossing the intersection, and the red light are both shown in the resulting image. This image is generally provided to a traffic enforcer as visual documentation of a violation. Further sophisticated systems also compute whether the vehicle came to a complete stop by processing a sequence of image frames.

Conventional cameras used to monitor traffic flow and signal compliance can support a variety of surveillance tasks. These cameras are adapted to monitor the scene by continuously capturing video or by controlling the timing to correspond with traffic light changes. These cameras are adapted to transmit the image data to a remote controller using video compression.

However, the process of relaying the image data to the controller is inefficient. The underlying communication network has bandwidth constraints that dictate the use of video compression techniques at the camera end and prior to transmission. Video compression is achieved by exploiting spatial redundancies within a video frame and temporal redundancies across video frames. Spatial redundancies refer to the fact that spatially adjacent pixels are close in value, so compression can be achieved by encoding only variations and/or differences in values between adjacent pixels within a frame. Temporal redundancies refer to the fact that temporally adjacent frames are very similar, so compression can be achieved by encoding only the differences between adjacent frames because the frames capture the same instant over a short time.

The compressed data, for an entire video sequence, is relayed to the central controller where the entire image data is decompressed and analyzed. This process of executing the video analytics tasks on the uncompressed video can result in an increased data processing burden. A reduction in computation time and resources is therefore desired.

The present disclosure provides a more efficient use of video data by determining a violator in a region being monitored as the captured image data is being compressed. Alternatively, the present disclosure can be executed on already compressed video streams without requiring that the entire data be fully decompressed. Other embodiments contemplate determining a violator on a region being monitored by processing motion vectors obtained from other processes such as optical flow and feature correspondence computation.

BRIEF DESCRIPTION

One embodiment of the disclosure relates to a method for enforcing traffic signal compliance. The method includes receiving video data from a camera. The method further includes defining a target area in the received video. The method includes identifying motion vectors in the video data. The method includes associating a cluster of motion vectors with a vehicle. The method further includes tracking a position of the vehicle across the two or more video frames. Using the tracking results, the method includes determining whether the vehicle stops in the target area. For the vehicle being determined as not stopping, the method includes signaling an occurrence of noncompliance.

Another embodiment of the disclosure relates to a system for enforcing traffic signal compliance. The system includes a video capture device including a video capture module, a motion vector extraction module, and a processor adapted to implement the modules. The video capture module is adapted to acquire a series of temporal related image frames including a target area. Each image frame includes pixel data representative of the target area. The motion vector extraction module is adapted to generate one or more motion vectors between two or more of the image frames. The motion vectors are the type produced in the process of compressing the pixel data associated with the two or more image frames. The motion vector extraction module further associates a cluster of motion vectors with a vehicle, and tracks a position of the vehicle across the two or more image frames. The system further includes a violation determination module and a processor adapted to implement the violation determination module. The violation determination module is adapted to use the tracking results to determine whether the vehicle stops in the target area. For the vehicle being determined as not stopping, the violation determination module signals an occurrence of noncompliance.

BRIEF DESCRIPTION OF THE DRAWINGS

FIG. 6B shows a current frame including a target block in a region corresponding to the search window in FIG. 6a.

DETAILED DESCRIPTION

The present disclosure relates to a system and method for automated video-based traffic enforcement. The system can operate within a compression video stream by generating and processing motion vectors as part of compression steps performed prior to transmission and/or archiving of the compressed data stream. Other embodiments contemplate the use of motion vectors extracted from processes such as optical flow and feature correspondence computation. More specifically, the present disclosure encodes select information as image data is being compressed at a camera and analyzes the compressed data for purposes of determining the occurrence of a traffic violation, enabling efficient retrieval of violation information by independently encoding frames where violations occur, and/or enforcing the traffic regulation.

Figure 2:
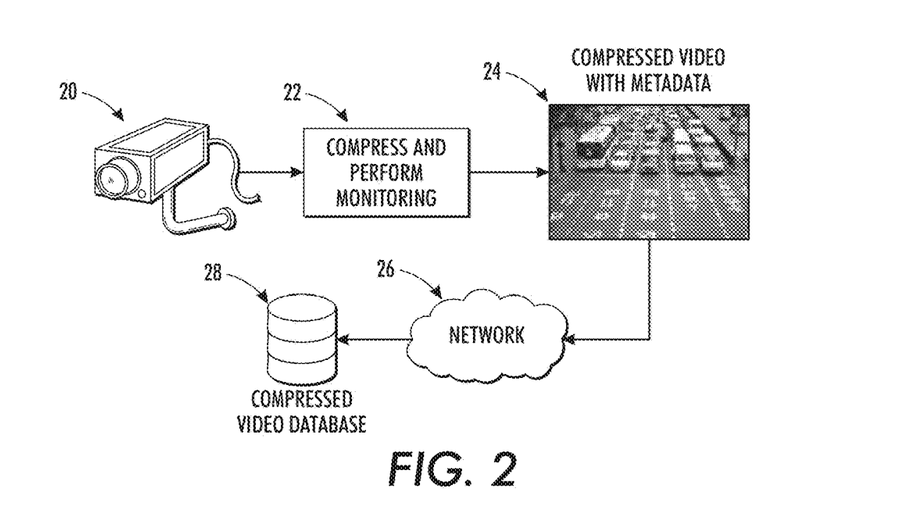
FIG. 2 is an overview of the system according to the disclosure.

An overview of the present disclosure is shown in FIG. 2. A traffic surveillance camera 20 captures video of a region of interest. In the contemplated embodiment, the region includes a street that leads to an intersection that is controlled by a stop indicator. Compliance with the stop indicator is performed as part of a video compression procedure 22 described herein. Generally, information about a detected violation event is embedded as metadata in a compressed video stream 24. More specifically, a virtual target area, spanning a region associated with the stop indicator, is determined within an enforcement camera's field of view. The camera captures a sequence of image frames while monitoring the target area. At the camera controller, motion vectors are determined between adjacent frames using the incoming, live uncompressed video stream. The vectors are the type that can be used for video compression. A cluster of motion vectors are used to detect a vehicle moving across the target area. The thresholds are applied to the cluster to determine whether the detected vehicle stopped with the area of the stop indicator. For a detected violation, relevant information about the violation event is embedded as metadata in the compressed video stream. The compressed video stream is transmitted, using a network 26, to a database 28 and/or user device, such as a traffic enforcement server.

Figure 3A:
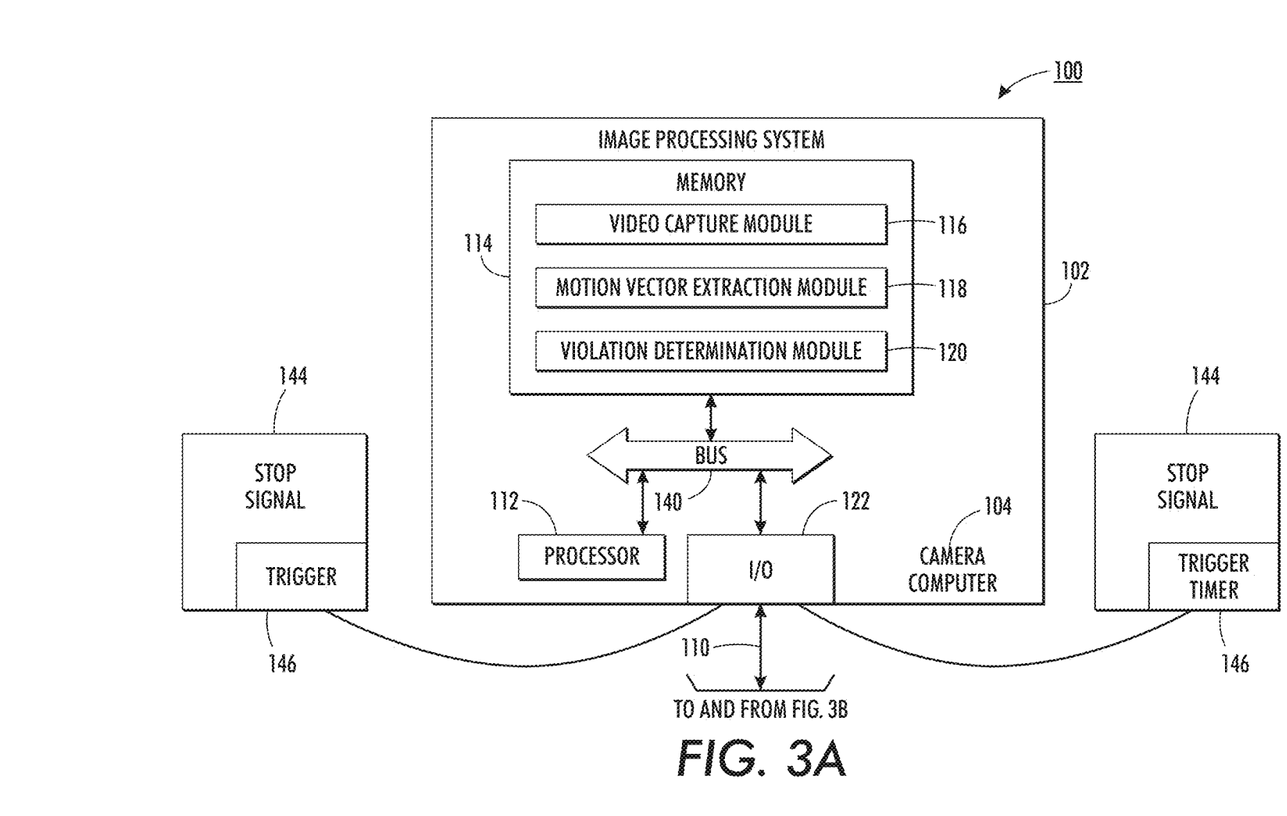
FIG. 3 is a schematic illustration of a traffic enforcement system according to one embodiment.
Figure 3B:
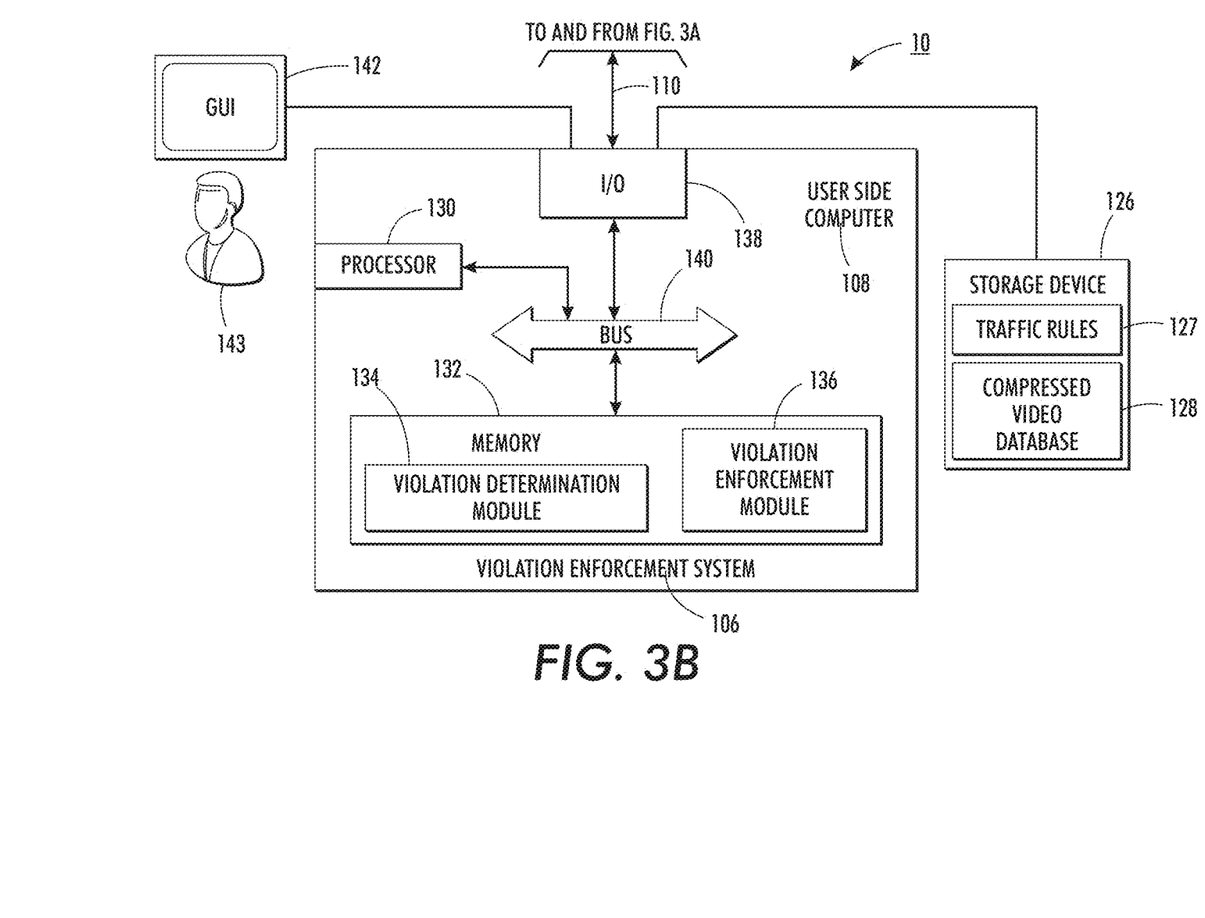

FIG. 3 is a functional block diagram of a traffic enforcement system 100 in one exemplary embodiment. The system 100 may include an video processing system 102, hosted by a computing device 104, such as a video capture device ("camera") at the traffic region being surveyed, and a violation enforcement system 106, hosted by a user device 108, such as a computer, at a user site, such as at a server, which are linked together by communication links 110, referred to herein as a network. These components are described in greater detail below.

The video processing system 102 illustrated in FIG. 3 includes a processor 112, which controls the overall operation of the video processing system 102 by execution of processing instructions, which are stored in memory 114 connected to the processor 112.

The motion vector generation and cluster tracking processes disclosed herein are performed by the processor 112 according to the instructions stored in the memory 114. In particular, the memory 114 stores video capture module 116, motion vector extraction module 118, and violation determination module 120.

The illustrated video capture module 116 acquires a series of temporal related image frames including a target area. Each image frame includes pixel data representative of the target area.

The illustrated motion vector extraction module 118 generates one or more motion vectors between two or more of the image frames, wherein the motion vectors are the type produced in the process of compressing the pixel data associated with the two or more image frames. Module 118 associates a cluster of motion vectors with a vehicle and tracks a position of the cluster across the two or more image frames. The module 118 also counts a number of consecutive frames across which the cluster persists. For the number of consecutive frames meeting and exceeding a threshold, module 118 associates the vehicle as an oncoming vehicle.

The illustrated violation determination module 120 uses the tracking results to determine whether the vehicle stops in the target area. Module 120 determines a first frame in the series corresponding to when the cluster disappears and a second frame corresponding to when the cluster reappears. Module 120 compares the number of frames between the first and second frames to a threshold. For the number of frames not meeting the threshold, module 120 associates the vehicle as not complying with a stop indicator and signals an occurrence of noncompliance. The module 120 transmits a signal and/or the compressed pixel data to the violation enforcement system 106.

The video processing system 102 also includes one or more communication interfaces (I/O), such as network interfaces 122 for communicating with external devices, such as the user device 108. The various hardware components 112, 114, 122 of the video processing system 102 may all be connected by a bus 124.

With continued reference to FIG. 3, the video processing system 102 includes a storage device 126 that is part of or in communication with the video processing system 102. In one embodiment, the video processing system 102 can be in communication with a server (not shown) that hosts storage device 126, for storing traffic rules 127 and/or a compressed video database 128 (for processing, for example, previously compressed data stored in the database).

The video processing system 102 of the traffic enforcement system 100 is communicatively linked with the violation enforcement system 106 via link 110. The violation enforcement system 106 includes a processor 130 and memory 132, and/or has access to a storage device such as storage device 126, for storing software modules executable by the processor 130. Memory 132 stores software instructions for implementing optional user-side parts of the exemplary method shown in FIG. 4. In particular, the instructions can include a violation determination module 134, which can acquire the compressed video data from the video processing system 102 and decompress the data for determining whether the vehicle stops in the target area. Module 134 can associate the vehicle as not complying with a stop indicator and generate a notice of noncompliance. A violation enforcement module 136 can process the decompressed data to generate information, such as license plate number and vehicle model information, etc., for providing to a user and/or for issuing a ticket. These modules 134, 136 will be later described with reference to the exemplary method. The violation enforcement system 106 further includes a communication interface (I/O) 138 including hardware and/or software suitable for providing wired or wireless data communication with the video processing system 102. The memory 132, processor 130, and communication interface 138 are communicatively linked by a bus 140.

With continued reference to FIG. 3, the user device 108 of the violation enforcement system 106 is communicatively linked to a user interface device (GUI) 142 via a wired and/or wireless link. In various embodiments, the user interface device 142 may include one or more of a display device, for displaying information to users, such as a video and/or an image frame showing the violating vehicle for a user 143, such as a law enforcement officer or agency, to review. The user interface 142 can further include a user input device, such as a keyboard or touch or writable screen, for inputting instructions and/or receiving a validation and/or correction provided by the user, and/or a cursor control device, such as a mouse, trackball, or the like, for communicating user input information and command selections to the processor 130. Specifically, the user interface device 142 includes at least one of an input device and an output device, both of which include hardware, and which are communicatively linked with the violation enforcement system 106 via wired and/or wireless link(s).

The traffic enforcement system 100 and, more specifically, the video processing system 102, may be linked to a stop signal 144, such as a stoplight or to any other type of automatic device in a monitored region, such as toll gates. In a stoplight setting, the camera can be activated to capture a scene (i.e., perform the violation detection process) during the durations when the traffic light is red. This activation requires communication between the traffic light controller and the camera. Each device 144 can include a trigger 146, such as a timer, which outputs a signal to the video processing system 102 for capturing the scene being surveyed, such as, for example, when a stoplight changes or when road signs illuminate and/or blink during certain conditions. In cases where multiple lanes are each controlled by a different traffic light, monitoring across each virtual target area can be independently activated depending on the state of the respective traffic light.

The memory 114, 140, 152, may represent any type of tangible computer readable medium such as random access memory (RAM), read only memory (ROM), magnetic disk or tape, optical disk, flash memory, or holographic memory. In one embodiment, the memory 114, 126, 132 may each comprise a combination of random access memory and read only memory. The digital processors 112, 130 can each be variously embodied, such as by a single-core processor, a dual-core processor (or more generally by a multiple-core processor), a digital processor and cooperating math coprocessor, a digital controller, or the like. The digital processors 112, 130 in addition to controlling the operation of the respective video processing system 102 or violation enforcement system 106, executes instructions stored in memory 114, 132 for performing the parts of the method outlined below.

The software modules as used herein, are intended to encompass any collection or set of instructions executable by the video processing system 102 or collection system 106 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 122, 138 may include, for example, a modem, a router, a cable, and/or Ethernet port, etc.

As will be appreciated, while two computing devices 104, 108 are illustrated by way of example, the system 100 may be hosted by fewer or more linked computing devices. Each computing device may include, for example, a camera, server computer, desktop, laptop, or tablet computer, smartphone or any other computing device capable of implementing the method described herein.

Figure 8:
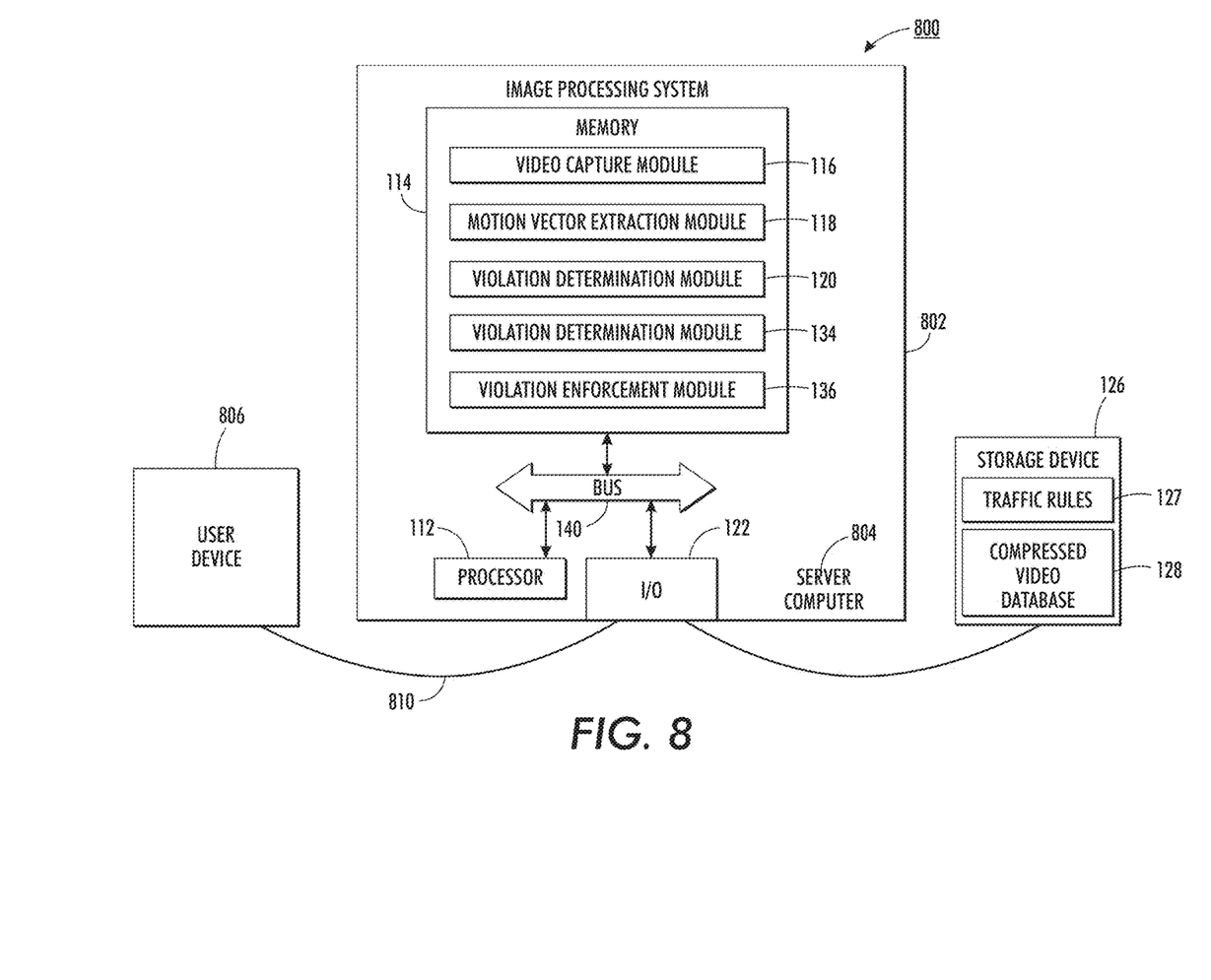
FIG. 8 is schematic illustration of a traffic enforcement system according to a different embodiment for processing the compressed data at a server computer.

FIG. 8 is a functional block diagram of an alternate traffic enforcement system 800, where similar components are identified with like reference numbers. Namely, in this embodiment, the compressed video is already stored in the storage device 126 and the processing of the data is performed at a server computer 804 having access to the stored data. The system 800 includes a video processing and violation enforcement system 802, hosted by the server computing device 804. The server 804 can be in communication with a user device 806, such as a computing device at a traffic enforcement authority or a vehicle device, using communication links 810, referred to herein as a network.

Figure 4A:
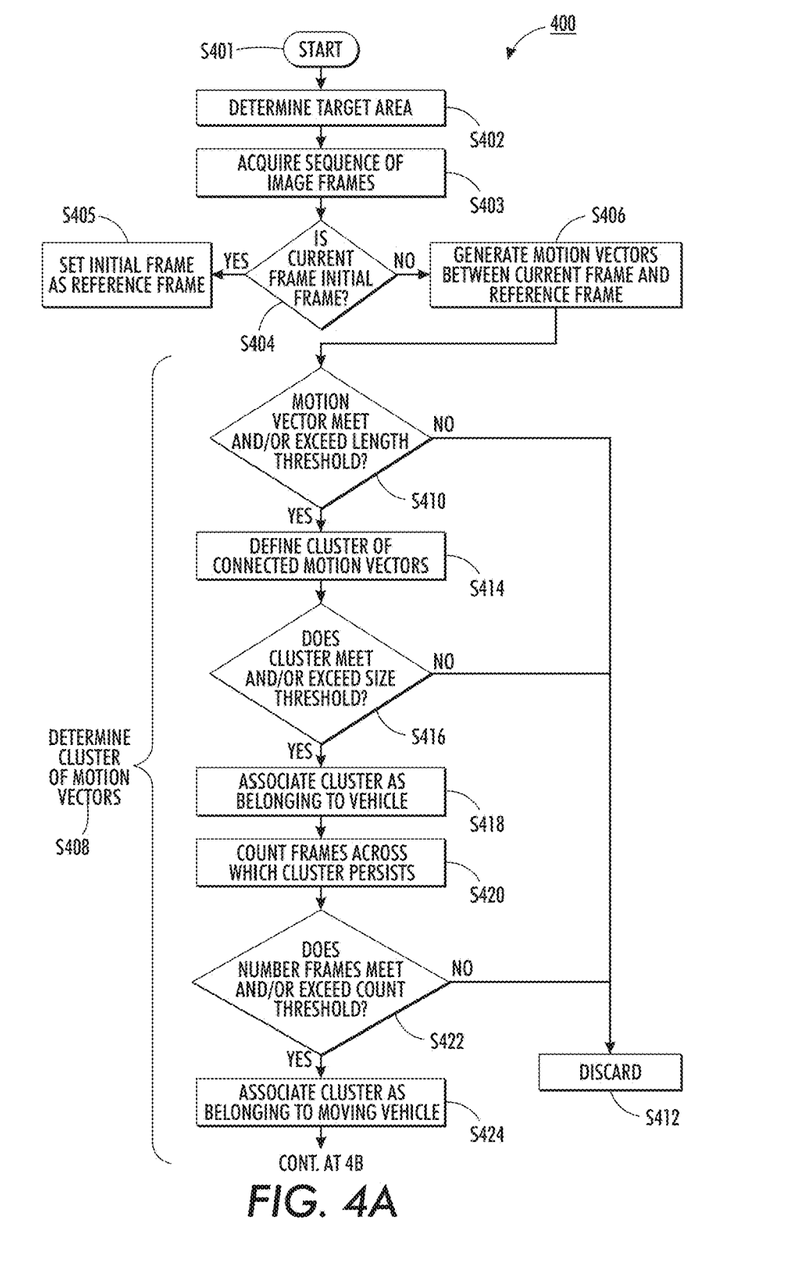
FIG. 4 is a flowchart describing a method 400 for enforcing traffic signal compliance.
Figure 4B:
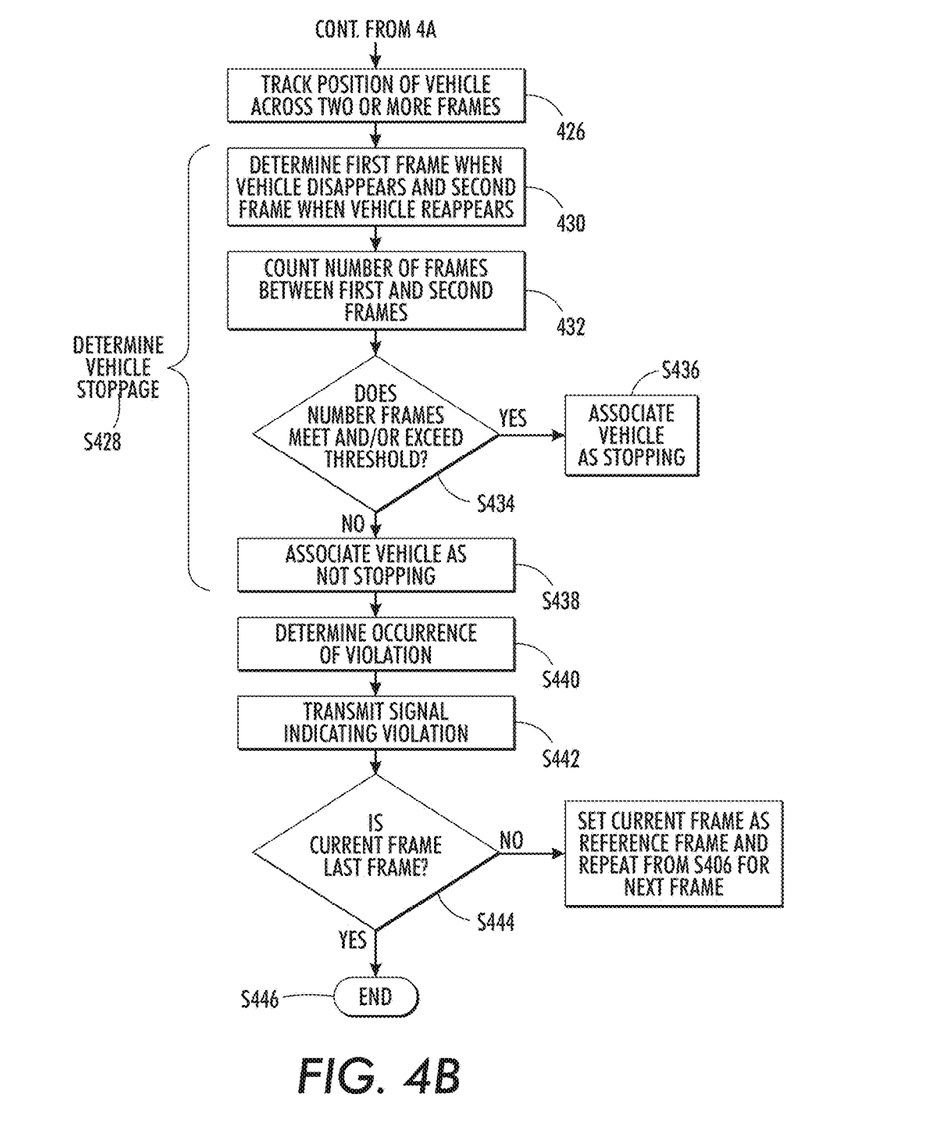

FIG. 4 is a flowchart describing a method 400 for enforcing traffic signal compliance. The method starts at S401. The process relies on a select camera being positioned in a desired region to be surveyed. The camera can include a conventional traffic camera, a still camera, or a video camera for capturing a sequence of image frames. The camera of the contemplated embodiment is an Internet Protocol (IP) camera adapted to capture frames and perform embedded video compression. However, embodiments are contemplated for performing the disclosed method using compressed video data that is rather acquired from the camera. In this manner, the compressed video may be available from a video data base. Generally, the camera is oriented toward capturing a particular object in a scene, such as a stationary stop indicator. The stop indicator can include, for example, an intersection, a stop line, a crosswalk, a stop signal, a stop sign, and a combination of the above. There is no limitation made herein to the object being observed.

An initialization process is performed when the camera is installed and/or subsequently calibrated. During the initialization process, a location of a virtual target area is determined within the camera's field of view at S402. Using a geometric configuration of the camera setup, the target area can be defined in image coordinates according to known processes, such as, for example, by mapping manually-input physical coordinates to pixel coordinates. The target can include a polygon, a circle, an ellipse, a line, a closed curve, an open curve, or a combination of the above. The area is not limited to single or multiple virtual polygons, but a contemplated embodiment includes a virtual polygon defined for each monitored traffic lane. Generally, the target area includes the stop indicator and at least a region surrounding the stop indicator. For example, in one embodiment, the target area can extend a select number of vehicle lengths behind the stop indicator. Namely, the target area is defined to include an area around the stop indicator that is large enough to detect motion of an oncoming vehicle and to determine whether the vehicle comes to stop. Accordingly, the target area must be large enough for the camera to capture the vehicle as it moves, stops, and starts moving again.

Continuing with FIG. 4, the system acquires a series of temporal related image frames including the target area at S403. Each image frame includes pixel data representative of the target area. The system determines if the current frame is an initial frame in the sequence at S404. For the current frame being the initial frame (YES at S404), the system sets the initial frame as a reference frame at S405. For the current frame not being the initial frame (NO at S404), the system performs a compression process by using the pixel data to generate one or more motion vectors between the reference and current frames at S406. The motion vectors are produced in the process of compressing the pixel data associated with the image frames. In other words, the vectors are used for video compression. More specifically, the camera is capturing image frames as a live, uncompressed video stream and the camera is compressing the image data without transmitting the raw pixel values. The compressed data includes motion vectors. Alternatively, motion vectors can be estimated from an optical flow process such as those proposed by Horn-Schunk, Lucas Kanade and Black. Other types of motion vectors can be computed by establishing correspondences between salient features of the vehicle at different time instants. Such salient features include Harris corners, Scale Invariant Feature Transform (SIFT), Speeded Up Robust Features (SURF), Maximally Stable Extremal Regions (MSER) and Local Binary Patterns (LBP).

More specifically, in one contemplated embodiment, the compressed data includes select motion vectors and discards remaining motion vectors. In the contemplated embodiment, motion vectors are extracted as part of a motion estimation stage of a compression process. The motion vectors are extracted within the confines of the virtual target area, but other embodiments are contemplated for extracting motion vectors in a full image frame.

Figure 5A:
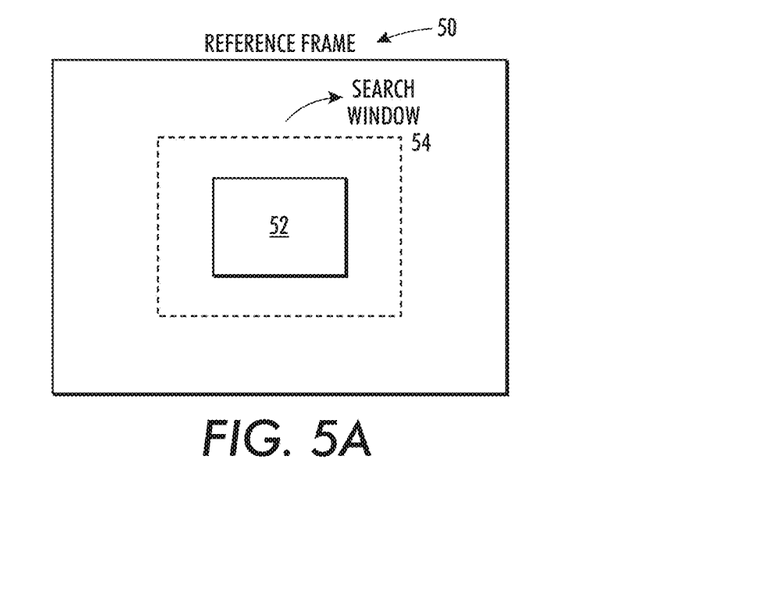
FIG. 5A shows a reference frame used in a block-based approach for generating motion vectors.
Figure 5B:
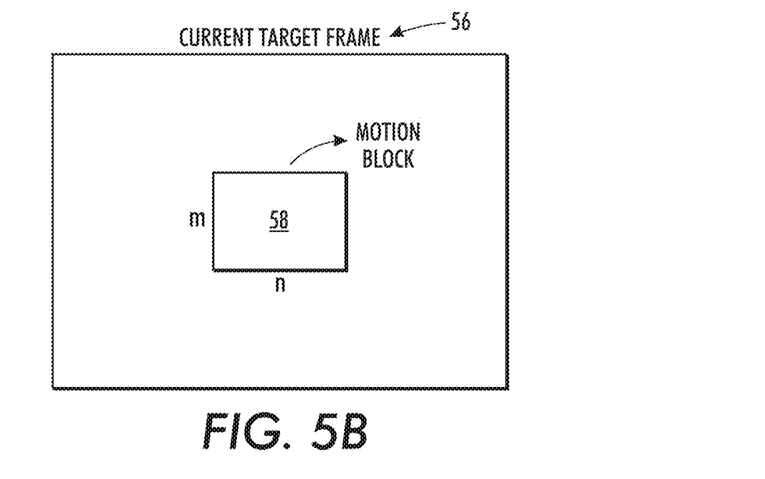
FIG. 5B shows a current frame used in a block-based approach for generating motion vectors.

In one embodiment, a block-based approach can be used to generate the motion vectors. Motion vectors in block-based approaches describe motion between matching blocks across adjacent frames. In the block-based approach, a current frame is compared with a reference frame. The current frame is divided into a number of blocks of a predetermined size. In one example, each block can be 16×16 pixels. For each reference block of m×n pixels in the reference frame, a current frame is searched for a target block that is most similar to the reference block. In one embodiment, a search window can be defined around the location of the reference block in the reference frame. FIG. 5A shows a reference frame 50 including a reference block 52 in a search window 54. FIG. 5B shows a current frame 56 including a target block 58 in a region corresponding to the search window of the reference frame. The search for the best matching block in a corresponding region of the search window can be conducted using a process understood in the art, such as, for example, a full extensive search, a binary search, a three step search, spiral search algorithms, and a combination of the above.

The searching is achieved by computing a similarity measure between each reference block and potential target blocks in the current frame. Displacements are computed between the select reference block and the target blocks. In one embodiment, the displacement is computed using a mean squared error (MSE) represented by equation (1):

$$MSE(d_1, d_2) = \frac{1}{mn} \sum (B(k, l, j) - B(k + d_1, l + d_2, j - 1))^2 \quad (1)$$

where $(d_1, d_2)$ is the vector that describes the relative displacement between reference and target blocks. In another embodiment, the displacement can be computed by calculating a mean absolute difference (MAD) using equation (2):

$$MAD(d_1, d_2) = \frac{1}{mn} \sum |B(k, l, j) - B(k + d_1, l + d_2, j - 1)| \quad (2)$$

In both equations (1) and (2), B(k,l,j) denotes the pixel located on the k-th row and l-th column of the m×n block of pixels in the j-th frame;
j−1-th frame is the reference frame, which is already encoded; and,
j-th frame is the current frame.
Because both MSE and MAD measure how dissimilar two blocks are, the similarity measure can be defined as the reciprocal or the negative MSE or MAD.

A block-based approach employed by compression algorithms understood in the art, such as the H264 and MPEG4 algorithms, can be used for extracting the motion vectors. The motion vector $(d_1,d_2)$ determined for the selected target block maximizes the similarity measure computed between the reference block and the potential target blocks.

Figure 6A:
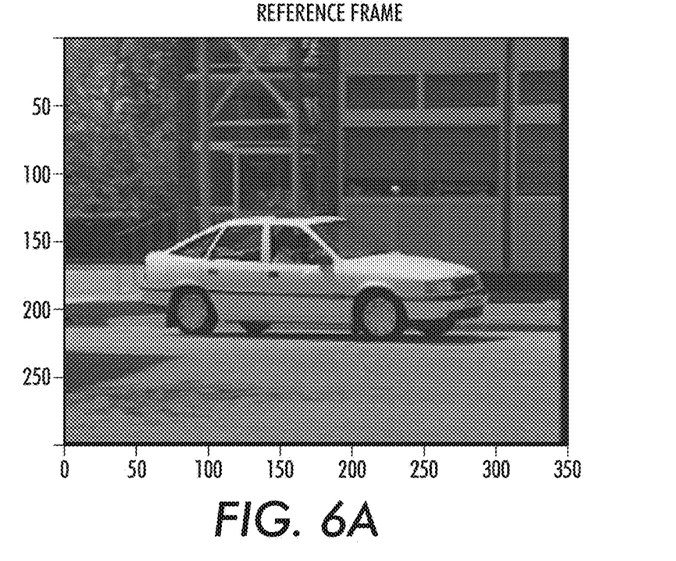
FIG. 6A shows a reference frame including a reference block in a search window.
Figure 6B:
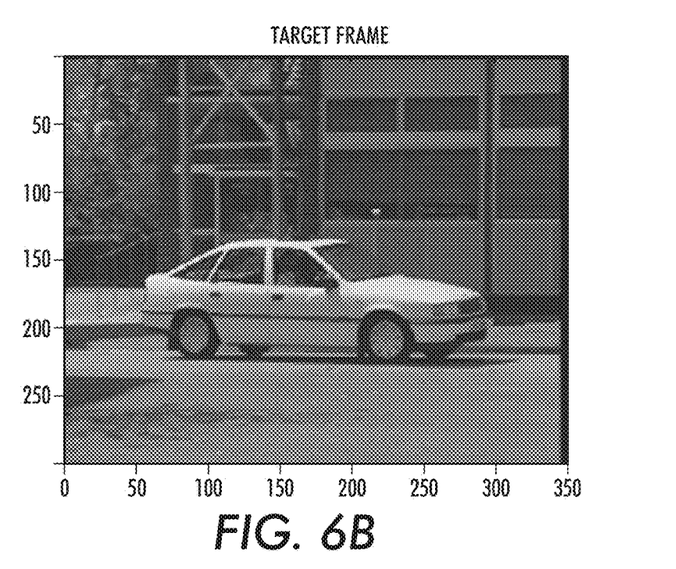
Figure 6C:
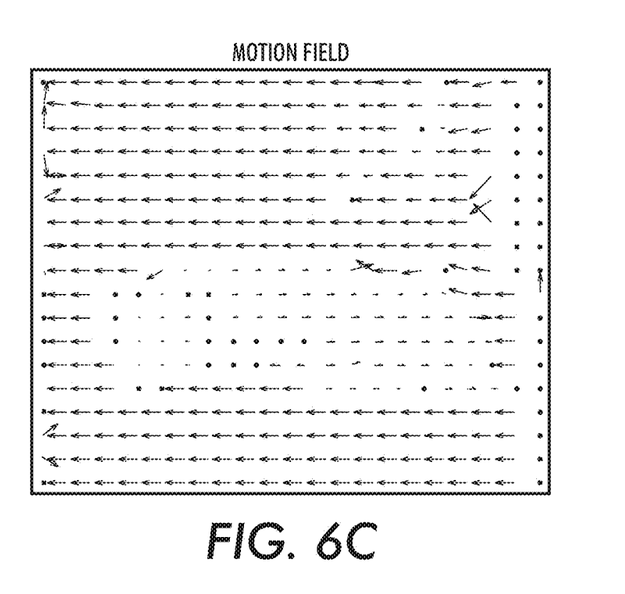
FIG. 6C shows a motion field generated between the reference frame of FIG. 6A and the target frame of FIG. 6B.
Figure 6D:
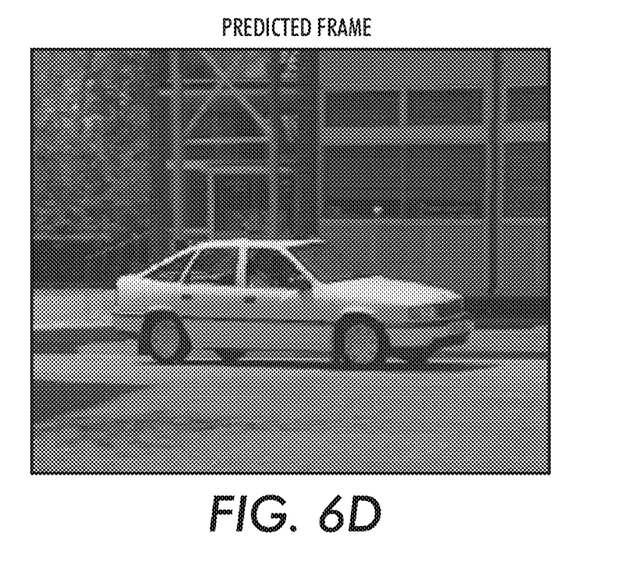
FIG. 6D shows a predicted image that result from stitching together the best-matching reference blocks.

In block-based motion compensation approaches, the motion vector is generated for describing the displacement for the block between the reference and the current frame. FIGS. 6A and 6B show example reference and target (i.e., current) frames, respectively. FIG. 6C shows the motion field in a reference frame resulting from the application of the block-based motion estimation algorithm with a 3m×3n search window (i.e., pixel search) to the reference frame depicted in FIG. 6A and the target frame from FIG. 6B. FIG. 6D shows the predicted image that result from stitching together the best-matching reference blocks. In this scenario, the camera is physically tracking a vehicle. Therefore, the camera pans from left to right as the vehicle moves across the scene. As a consequence, all apparent movement that is captured by the motion field is that of the background moving from left to right relative to the camera. In the case where the camera pans, segmentation between the stationary background and moving objects can be achieved by thresholding the resulting motion vectors not only according to their magnitude, but also according to their orientation. This is because, when the pattern of motion of the camera is known, such as in a PTZ camera, the characteristics of the motion vector field associated with stationary objects (in apparent motion due to camera motion) are known. For example, if the camera pans from left to right, all motion vectors above a certain magnitude and roughly oriented from right to left at an angle located in an interval centered at 180 degrees may be considered as background vectors. For zooming cameras, stationary objects will appear to be diverging from the focus of expansion. For tilting motion of the camera, stationary background objects will appear to be moving vertically. Any image region not identified as belonging to the background is assumed to correspond to a moving object. Regions of the image corresponding to vehicles in motion can be extracted from the set of detected moving objects according to their size, shape, aspect ratio, etc. When applying the present vector-based stop detection method to a PTZ or other moving camera setting, a vector difference between the vehicle cluster and the background can be used as a vector to represent the vehicle motion.

Figure 7A:
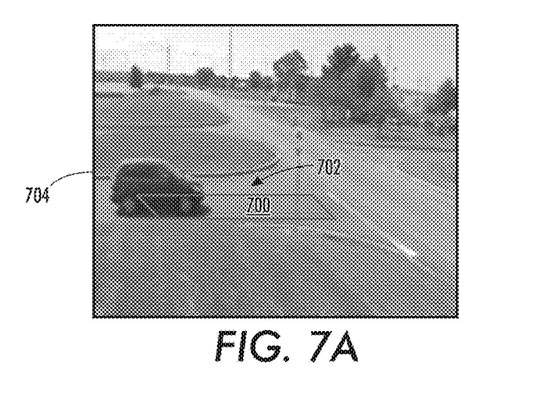
FIGS. 7A-7C illustrate a location of the defined target area being used in conjunction with motion vectors, generated for a current frame, to trigger a vehicle detection.
Figure 7B:
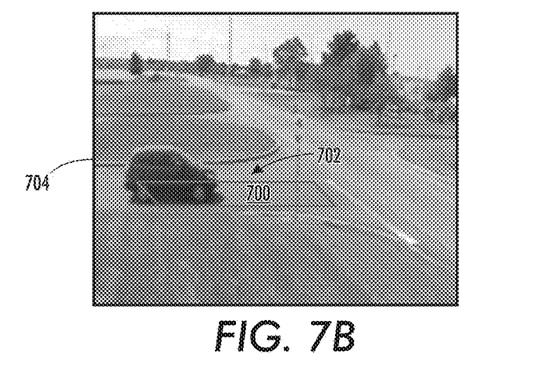
Figure 7C:
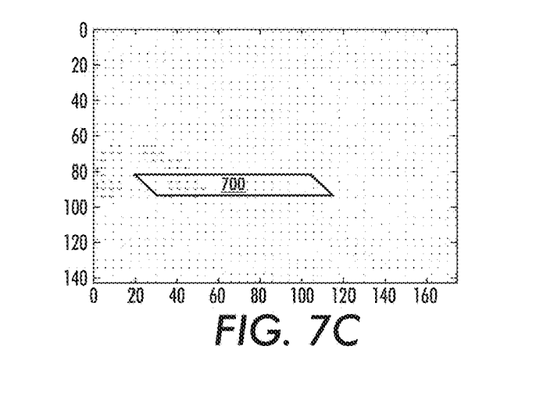

FIGS. 7A-7C illustrate a location of the defined target area being used in conjunction with motion vectors, generated for a current frame, to trigger a vehicle detection. More specifically, FIGS. 7A and 7B show two adjacent image frames, such as a reference frame (FIG. 7A) and a target frame (FIG. 7B) in an example sequence. FIG. 7C shows a corresponding m×n pixel motion vector field. A target area 700 is represented by a virtual polygon and is superimposed in FIGS. 7A-7C. This target area 700 traverses the road lane 702 being monitored.

Continuing with FIG. 4, the camera determines a cluster of motion vectors at S408. The cluster of motion vectors is used to detect a presence of a vehicle that moves across the target area between image frames. Because clusters of motion vectors indicate the existence of a moving object in the area captured by the blocks, a threshold is applied at S410 to each motion vector, generated between the reference and current frame to distinguish between moving and stationary objects. The threshold $N_1$ can include a predetermined vector length or magnitude. Each motion vector that does not meet the length threshold (NO at S410) is discarded at S412. For each motion vector that meets and/or exceeds the threshold (YES at S410), a cluster is defined for each group of one or more connected (i.e., neighboring and adjacent) motion vectors at S414.

Returning to FIG. 7, as a vehicle 704 moves across the target area 700, a number of active motion vectors are located inside the target area. Because clusters of motion vectors indicate the existence of a moving object in the area captured by the blocks, a threshold $N_2$ is applied at S416 (FIG. 4) to each identified cluster to distinguish between a moving vehicle and other moving objects.

The threshold $N_2$ is applied for avoiding false positives that are caused by active motion vectors that are produced by an apparent motion of objects different than vehicles, such as, for example camera shake, moving leaves, debris, clouds, and water, etc. Only clusters with a size larger than a predetermined threshold $N_2$ are considered as belonging to a moving vehicle to avoid the false positives caused by fictitious sources of motion. Each cluster that does not meet the size threshold (NO at S416) is discarded at S412. For each cluster that meets and/or exceeds the size threshold (YES at S416), a cluster is associated as belonging to a vehicle at S418. The predetermined size threshold is defined by the smallest cluster of active connected motion vectors that can be situated inside the target area for triggering vehicle detection. The value of the size threshold can depend on the geometry of the camera setup, the size of the virtual polygon, the resolution of the video sequence as well as on the size of the blocks used in the motion estimation algorithm. In one contemplated embodiment, the size threshold can include a number of pixels being ½m for an m×n block. For example, the size threshold can be 8 pixels for a 16×16 pixel block or 24 pixels for a 48×48 pixel block.

Continuing with FIG. 4, a number of consecutive frames are counted across which the cluster belonging to the vehicle persists at S420. The number of consecutive frames is compared to a threshold $N_3$ at S422. The threshold $N_3$ includes a predetermined (e.g., lowest) number of consecutive frames that the determined cluster can be located inside the target area before the detected vehicle is associated as belonging to an oncoming vehicle. The value of the count threshold $N_3$ can depend on the value of the size threshold $N_2$, geometry of the camera setup, a size of the target area, a frame rate, and an average speed limit of the street being monitored. For the number of frames not meeting the count threshold (NO at S422), the process ends. For each number that meets and/or exceeds the count threshold (YES at S422), the cluster is associated as belonging to a moving and/or oncoming vehicle at S424.

For the parameters described above, a contemplated count threshold $N_3$ can be six (6) image frames. Accordingly, the system can detect a moving vehicle on the $N_3$-th consecutive frame in which clusters meeting and/or exceeding the predetermined size $N_2$ are located inside the virtual polygon.

With continued reference to FIG. 4, a position of the identified vehicle is tracked across two or more frames at S426. Stoppage detection, using the delimited target area, relies on an assumption that the motion of a real object is smooth. Once the moving vehicle is detected, the associated cluster is tracked across time as it moves across the target area. An overlap between (same-size) clusters across multiple frames can correspond to the same object. Accordingly, in one embodiment, the tracking can include determining an overlap between clusters across adjacent frames. The overlap can be compared to a predetermined threshold. For an overlap meeting and/or exceeding the threshold, the cluster can be associated as belonging to the same moving vehicle. In this manner, multiple vehicles can be reliably monitored at the same time.

Using the tracking results, movement of the vehicle is monitored to determine whether the vehicle stops at S428. Vehicle stoppage is defined as a sustained absence of motion observed within boundaries defining the target areas in consecutive frames. Vehicle stoppage is detected when the tracked cluster becomes inactive for a number of frames greater than a predetermined threshold $F_0$. Specifically, if the tracked cluster goes from having at least $N_1$ active motion blocks to having fewer than $N_1'$ active motion blocks (where $N_1' \leq N_1$) and the inactivity status persists for over $F_0$ frames, vehicle stoppage is detected. Alternatively, the stoppage can be determined by an absence of vehicle motion during a predetermined duration ($F_0$/frame rate) computed after the vehicle has been detected. The value of the threshold $F_0$ can depend on the video frame rate and can vary across jurisdictions depending on the stipulations of local traffic law.

Generally, a first frame is determined in the sequence corresponding to when the cluster disappears and a second frame is determined in the sequence corresponding to when the cluster reappears (S430). A number of frames are counted between the first and second frames at S432). The number of frames is compared to the threshold $F_0$ at S434. For the number of frames meeting and/or exceeding the threshold $F_0$ (YES at S434), the vehicle is detected as stopping near the stop indicator at S436. For the number of frames not meeting the threshold $F_0$ (NO at S434), the vehicle is detected as not stopping at S438.

Because an absence of motion vectors can also indicate that the vehicle has left the target area, a return of motion should follow the detected vehicle stoppage. Namely, the cluster should reappear in a subsequent frame. Generally, an overlap between boundaries of tracked clusters is determined. The boundaries of the tracked vehicle cluster (i.e., before disappearing) are compared with boundaries of a new cluster produced by a moving vehicle in a subsequent frame (i.e., when a cluster reappears). In other words, boundaries between clusters in the earlier-mentioned first and second frames are compared. For an overlap indicating that the active clusters between the first and second frames belong to the same vehicle, the tracking continues until the cluster touches and/or crosses a boundary of the target area that is closest to the stop indicator.

Continuing with FIG. 4, a violation is determined at S440 as occurring when a vehicle traverses the target area without stopping. Because a shape of a target area can be defined to enable enforcement in different types of traffic zones, occurrence of a violation can be triggered, in one embodiment, for only instances when the vehicle fails to comply with specific traffic rules. For example, traffic rules corresponding to a specific exit zone can permit a vehicle to resume motion (i.e., to exit the target area) if it is turning at the stop indicator, but may not permit the vehicle to resume motion if the vehicle is not turning. An example scenario is "right on red", whereby vehicles are permitted to turn right (generally after making a complete stop) at a traffic light showing a red signal when the way is clear. Therefore, a violation can be triggered if the tracked vehicle exits the target area by turning left or continuing straight when the traffic light is red. In this manner, the camera computing device 104 can refer a look-up table (LUT) stored in the storage device 126 for applying a rule corresponding to the monitored target area. Conversely, no violation is triggered if the tracked vehicle turns right.

Continuing with FIG. 4, a signal of the violation can be provided in response to the detected violation at S442. More specifically, a signal can be transmitted to the user device. The signal can include any form of notification relayed to a user device. Relevant information about the violation event can be embedded as metadata in the compressed video stream, which can be alternatively or further provided to the user device. Embedding the violation information directly into the video is a useful method of recording the violation incident.

As mentioned, the signal and/or compressed data are transmitted to a user device. The user device can include a vehicle computing system, such as a GPS, whereby the notification can alert a driver to the violation. For example, the notification can include a warning light. In another embodiment, the user device can include a computing device (such as a customer side server) located at or in communication with a traffic enforcement agency or violation processing authority, whereby the following information can be transmitted to the user device in the embedded data: a date and/or time of the violation; vehicle information, such as license plate number, make and model, etc.; duration (i.e., elapsed time) between when the stoplight turned red and the violating vehicle entered the intersection; and, a combination of the above. There is no limitation made herein to the information included in the embedded data.

The system then determines if the current frame is the last frame in the sequence at S444. In response to the current frame not being the last frame in the sequence (NO at S444), the method returns to S406 to repeat the above-described process on the next frame. In response to the current frame being the last frame in the sequence (YES at S444), the method ends at S446.

In another contemplated embodiment, the method can be implemented in a central processor that has access to the compressed video data. This embodiment enables violation detection using a decoding process applied to only the motion vectors, rather than the decompression of the complete video. Because the method relies on the processing of information conveyed by motion vectors, the method can alternatively be executed on already compressed video streams without the need to fully decompress the video, thus making it more computationally efficient than a conventional approach, which performs complex operations on the fully decompressed video stream. The proposed method can also be used to process stored video/image data that is already compressed for historical data analysis purposes.

The ability to include metadata of various types is a key element of the H264 and MPEG4 algorithms contemplated for extracting the motion vectors in S406. One aspect of this process is compression standards that enable a compressed video stream to be parsed without actually decoding the video/audio content. This feature provides for additional computational savings.

Another aspect of the disclosure includes rapid decompression of image data associated with violating vehicles. Select image frames within the sequence, such as the first, a middle, and the last frame including the detected vehicle, can be encoded as reference frames for subsequent, rapid decompression. These select frames can be rapidly decompressed for viewing by a user to verify occurrence of a violation or for identifying future violations. The image data can be used as evidence for issuing a citation to the violator. This feature can be enabled by selecting certain frames to be I-frames understood in the art. For instance, rapid decompression for an image sequence capturing a vehicle driving through the stop indicator can be enabled by selecting an I-frame at the time the vehicle enters the target area.

Building the violation detection directly into the compression step enables violation information to be embedded at the camera prior to transmission using a small amount of computation. One aspect of this feature is that it negates a need for further processing, such as, decompression, violation detection and recompression, at the customer/enforcer-side server. This feature results in bandwidth savings when the violation detection is performed at the camera rather than at the central server. In this scenario, bandwidth can be reduced by only transmitting images of violators to the central location for archival and evidentiary use. Alternatively, video frames containing occurrences of violations may be encoded as reference frames to facilitate future video searches in case the full video feed is transmitted and stored.

Another aspect provided by the disclosure is a single pole solution compared to conventional multi-pole solutions that are used for detecting stoplight violators.

Although the control method 400 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4 can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A vector-based stop detection method for enforcing traffic signal compliance, the method comprising:
   receiving video data from a surveillance camera;
   defining a target area in the received video data;
   dividing a current frame into a number of blocks;
   computing a displacement for a block between a reference frame and the current frame and describing the displacement of the block as a motion vector;
   defining a cluster as a group of one or more connected motion vectors having a length meeting or exceeding a first vector length threshold and classifying a block having a motion vector meeting or exceeding the first vector length as an active motion block;
   in response to a number of active motion blocks in the cluster meeting or exceeding a cluster size threshold, classifying the cluster of motion vectors as belonging to a vehicle;
   tracking a position of the cluster across two or more video frames;
   monitoring the length of motion vectors of the cluster in the two or more video frames and reclassifying any motion vector that no longer exceeds the first vector length threshold as not an active motion block;
   in response to the cluster transitioning from having the number of active motion blocks meeting or exceeding the cluster size threshold to having fewer than a second number of active motion blocks, classifying the cluster as being inactive;
   in response to the inactivity of the cluster persisting for a predetermined duration, classifying the vehicle as being stationary;
   in response to the activity of the cluster persisting in the target area, classifying the vehicle as not being stationary and transmitting a signal and compressed pixel data to a second device.

2. The method of claim 1 wherein the motion vectors are a type produced in the process of compressing pixel data associated with the two or more video frames.

3. The method of claim 2, wherein the video data is compressed video data, and the motion vectors are extracted from the compressed video data.

4. The method of claim 2, wherein the received video data includes a live uncompressed video stream, and wherein the motion vectors are generated during video compression.

5. The method of claim 1 wherein the motion vectors are one of those extracted from optical flow data between the two or more video frames and those establishing correspondences between frames across a plurality of video frames.

6. The method of claim 1, further comprising:
   defining the target area in image coordinates as including one or more of a polygon, a circle, an ellipse, a closed curve, an open curve, and a line.

7. The method of claim 1, wherein the target area includes a stationary stop indicator.

8. The method of claim 7, wherein the stop indicator is selected from a group consisting of: an intersection; a stop line; a crosswalk; a stop signal; a stop sign; and, a combination of the above.

9. The method of claim 7, wherein the target area extends at least one vehicle length behind the stop indicator.

10. The method of claim 1 further comprising:
    counting a number of consecutive frames across which the cluster persists;
    comparing the number of consecutive frames to a threshold; and,
    for the number of consecutive frames meeting and exceeding the threshold, associating the vehicle as an oncoming vehicle.

11. The method of claim 1, further comprising:
    determining whether the vehicle stops in the target area by:
        determining a first frame in the series corresponding to when the cluster disappears and determining a second frame in the series corresponding to when the cluster reappears;
        counting a number of frames between the first and second frames;
        comparing the number of frames to a threshold; and
        for the number of frames not meeting the threshold, associating the vehicle as not stopping.

12. A computer program product comprising a non-transitory computer-readable medium which encodes instructions for performing the method of claim 1.

13. A system for enforcing traffic signal compliance, the system comprising:
    a video capture device comprising memory which stores instructions for performing the method of claim 1 and a processor, in communication with the memory for executing the instructions.

14. A vector-based stop detection system for enforcing traffic signal compliance, the system comprising:
    a video capture device including:
        a video capture module configured to acquire a series of temporal related image frames including a target area, each image frame including pixel data representative of the target area;
        a motion vector extraction module adapted to:
            divide a current frame into a number of blocks,
            compute a displacement for a block between a reference frame and the current frame,
            describe the displacement of the block as a motion vector, define a cluster as a group of one or more connected motion vectors having a length meeting or exceeding a first vector length threshold, in response to a number of blocks in the cluster meeting or exceeding a cluster size threshold, characterize the cluster of motion vectors as belonging to a vehicle; and, a violation determination module configured to:

in response to the cluster transitioning from having the number of active motion blocks meeting or exceeding the cluster size threshold to having fewer than a second number of active motion blocks, classifying the cluster as being inactive;

in response to the inactivity of the cluster persisting for a predetermined duration, characterize the vehicle as being stationary; and in response to the vehicle not stopping in the target area, transmit at least one of a signal and the compressed pixel data to a second device.

15. The system of claim 14, wherein the motion vector extraction module is further configured to:

in a current frame, define the target area in image coordinates as including one or more of a polygon, a circle, an ellipse, a closed curve, an open curve, and a line.

16. The system of claim 15, wherein the target area includes a stationary stop indicator selected from a group consisting: an intersection; a stop line; a crosswalk; a stop signal; a stop sign; and, a combination of the above.

17. The system of claim 15, wherein the target area extends at least one vehicle length behind the stop indicator.

18. The system of claim 14, wherein the motion vector extraction module is further configured to:

count a number of consecutive frames across which the cluster persists;

compare the number of consecutive frames to a third threshold; and, for the number of consecutive frames meeting and exceeding a third threshold, associate the vehicle as an oncoming vehicle.

19. The system of claim 14, wherein the violation determination module is further configured to:

determine a first frame in the series corresponding to when the cluster disappears and determine a second frame in the series corresponding to when the cluster reappears;

count a number of frames between the first and second frames;

compare the number of frames to a stop time threshold; and for the number of frames not meeting the stop time threshold, associate the vehicle as not complying with a stop indicator.

20. The system of claim 14, wherein the violation determination module is included in one of the image capture device and a second, remote device.

* * * * *